US012789261B2

(12) United States Patent
Amaral De Figueiredo et al.

(10) Patent No.: US 12,789,261 B2
(45) Date of Patent: Nov. 10, 2026

(54) DOUBLE-SIDED TURNING INSERT

(71) Applicant: Palbit S.A., Branca Alb (PT)

(72) Inventors: Daniel Amaral De Figueiredo, Sever Do Vouga (PT); Luis Pedro Alves Henriques, São Pedro da Cadeira (PT)

(73) Assignee: Palbit, S.A. (PT)

(*) Notice: Subject to any disclaimer, the term of this patent is extended or adjusted under 35 U.S.C. 154(b) by 966 days.

(21) Appl. No.: 17/791,838

(22) PCT Filed: Jan. 11, 2021

(86) PCT No.: PCT/IB2021/050178

§ 371 (c)(1),
(2) Date: Jul. 8, 2022

(87) PCT Pub. No.: WO2021/140496

PCT Pub. Date: Jul. 15, 2021

(65) Prior Publication Data

US 2023/0044382 A1 Feb. 9, 2023

(30) Foreign Application Priority Data

Jan. 10, 2020 (PT) ........................................ 116054
Jun. 16, 2020 (EP) .................................... 20180302

(51) Int. Cl.
*B23B 27/16* (2006.01)

(52) U.S. Cl.
CPC ... *B23B 27/1611* (2013.01); *B23B 2200/0447* (2013.01); *B23B 2200/125* (2013.01); *B23B 2200/323* (2013.01); *B23B 2200/3681* (2013.01)

(58) Field of Classification Search
CPC .............. B23B 27/1651; B23B 27/164; B23B 27/1622; B23B 27/145; B23B 27/1607;
(Continued)

(56) References Cited

U.S. PATENT DOCUMENTS

2013/0129430 A1* 5/2013 Bhagath ................ B23B 27/145
407/100
2016/0082528 A1* 3/2016 Ballas ....................... B23C 5/06
407/48
2019/0351492 A1* 11/2019 Shiroma ................ B23C 5/109

FOREIGN PATENT DOCUMENTS

DE 1777399 A1 2/1974
EP 1093874 A1 4/2001
(Continued)

*Primary Examiner* — Sunil K Singh
*Assistant Examiner* — Eric Daniel Whitmire
(74) *Attorney, Agent, or Firm* — Gloria Tsui-Yip; Gottlieb, Rackman & Reisman, P.C.

(57) ABSTRACT

A rhomboid-shaped double-sided turning insert with a convex cutting corner flanked by two flank faces. Each side of the insert includes: a rhomboid-shaped rake face opposite the opposite side; a lateral cutting corner surface arranged adjoining and between the two flank faces; two flanking edges, each formed between a respective flank face and a rhomboid side of the rake face; a cutting edge formed by straight primary and secondary cutting edges, formed between the lateral cutting corner surface and the rake face, arranged adjoining and between the two flanking edges. The primary cutting edge is longer than the secondary cutting edge; and a chip-deflecting surface which is recessed and arranged inwardly of the cutting edge.

A lateral cutting corner surface of the insert extends between the first side and second side cutting edges. The primary and secondary cutting edges are in reversed positions between the first and second sides.

14 Claims, 10 Drawing Sheets

(58) Field of Classification Search
CPC ............. B23B 27/1603; B23B 27/1611; B23C 2200/28; B23C 2200/206; B23C 2200/205; B23C 2200/126; B23C 2200/125; B23C 2200/0433
See application file for complete search history.

(56) References Cited

FOREIGN PATENT DOCUMENTS

| | | | |
|---|---|---|---|
| EP | 1297922 | A1 | 4/2003 |
| EP | 1475171 | A2 | 11/2004 |
| EP | 2489454 | A1 | 8/2012 |
| WO | WO2010002344 | A1 | 1/2010 |

* cited by examiner

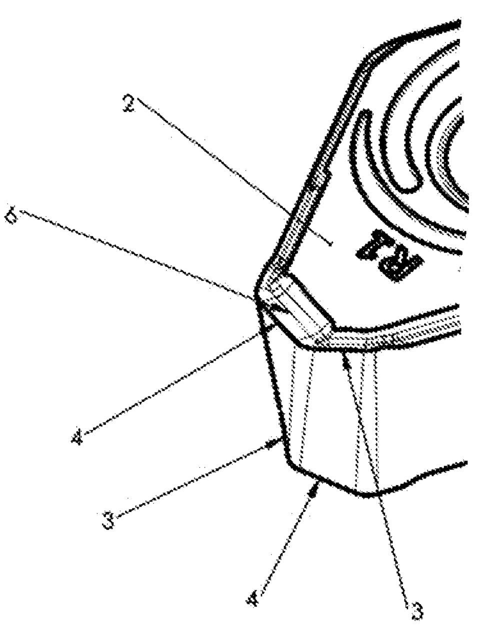
Fig. 5.1(a)
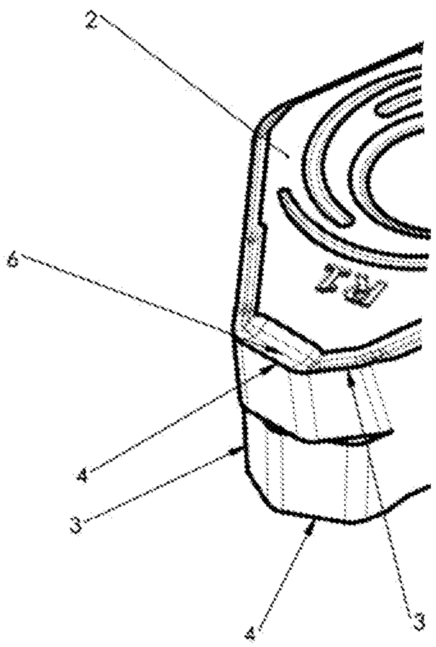
Fig. 5.1(b)
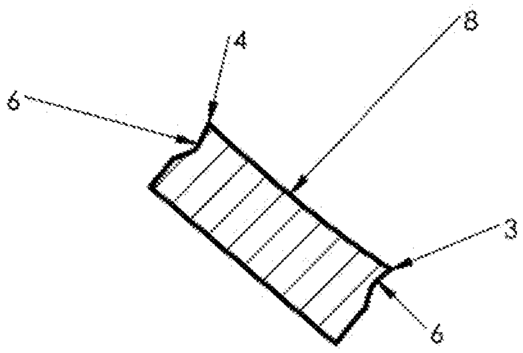
Section F-F
Fig. 5.2(a)
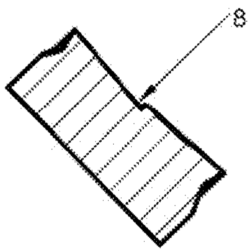
Section F-F
Fig. 5.2(b)

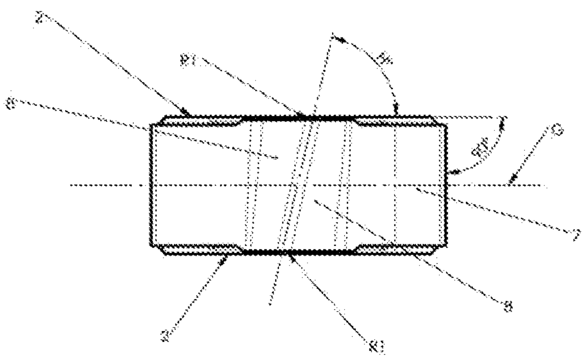
Fig. 5.3(a)
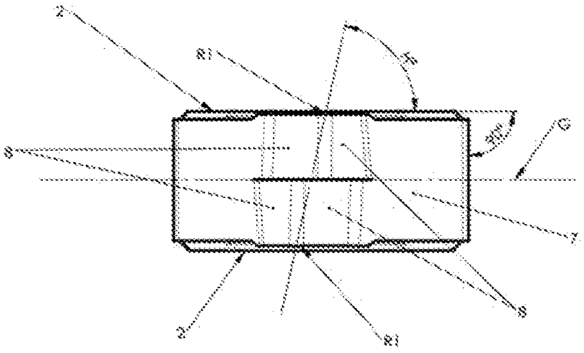
Fig. 5.3(b)
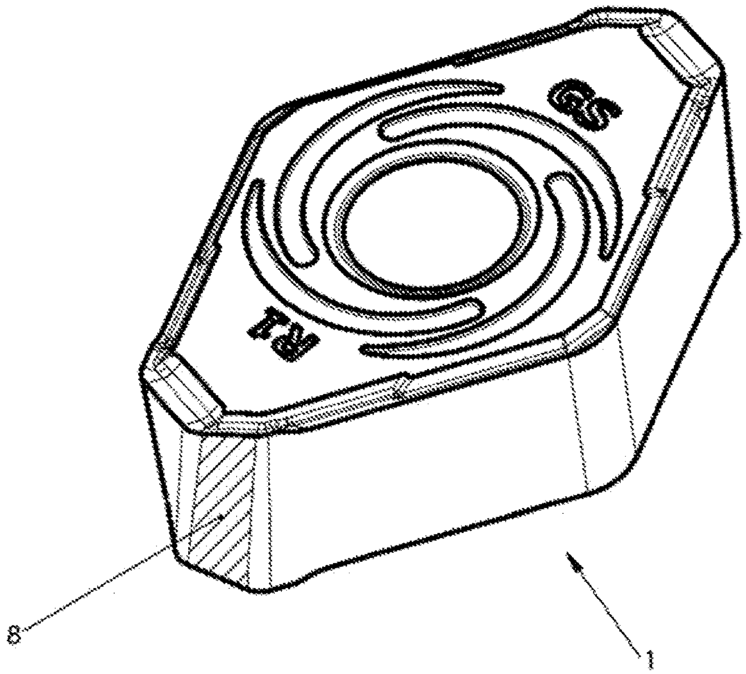
Fig. 6

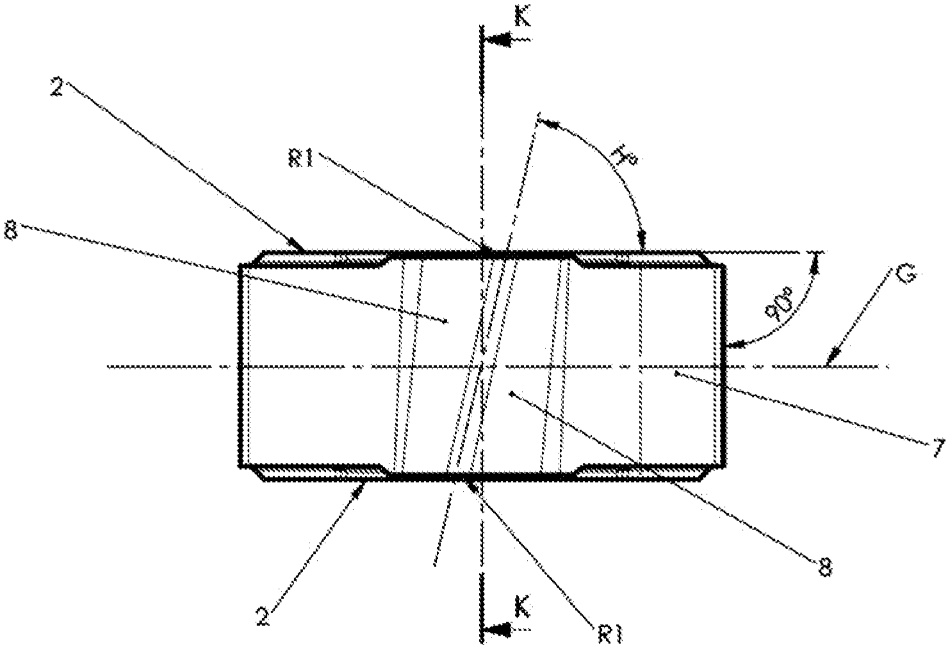
Fig. 7.1
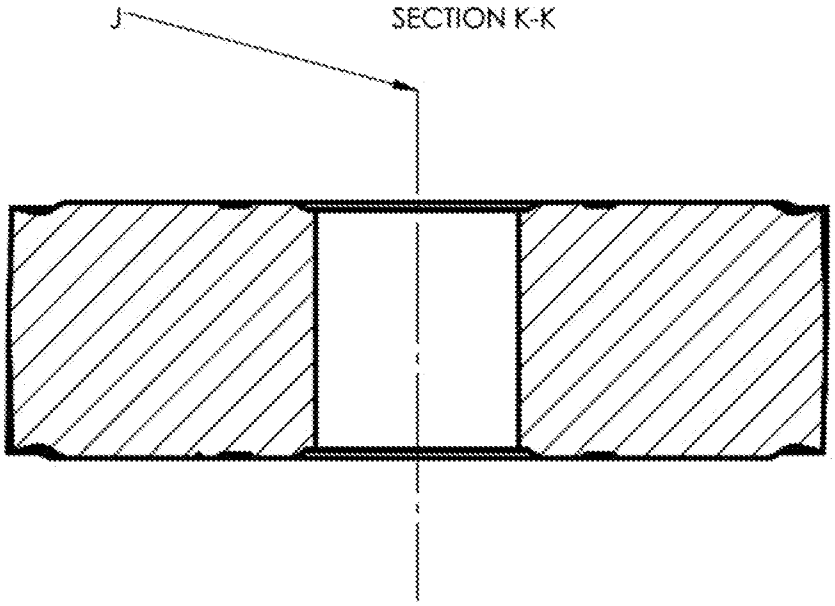
Fig. 7.2

DOUBLE-SIDED TURNING INSERT

TECHNICAL FIELD

The present disclosure relates to a turning insert, in particular for metal cutting operations.

BACKGROUND

Cutting inserts in general are replaceable wearing parts and are detachably mounted in different kinds of holders for cutting tools, which may be used industrially in different metal cutting operations, in particular turning process.

The wear and fail mode of turning inserts used for turning operations is a problem that the experts have tried to solve in a number of different ways. Generally, modifications are possible on the rake face, chipbreaker geometry, flank face relief angle, edge position angle defined by the toolholder, nose edge radius and insert material and coating, among other parameters.

The workpieces that are machined usually consist of metallic alloys, and the cutting inserts are normally made from a hard material, such as cemented carbide, ceramic material, normally using performant coating materials, while the holders of the tools are made from a more elastic material, in particular steel.

Document WO201002344A1 relates to a cutting insert for turning in steel, stainless steel and heat resistant super alloys comprising a substrate and a coating. The insert has a rake face, a flank face, cutting edges and a cutting corner. The insert comprises a cemented carbide substrate.

Document EP1297922A1 relates to a cutting insert, intended for chip removing machining, which includes a cutting geometry surface which in a direction from a cutting edge towards the middle of the insert, includes a primary chamfer that transforms into a chip removing surface, which is inclined in the direction inwards/downwards in order to permit sinking of a chip being under formation, and which transforms into a deflection surface arranged to be met by the chip and at least initiate deflection or guiding away of the same from the cutting insert.

Document EP1475171A2 relates to a turning insert which includes at least one cutting surface having at least one corner area. The corner area defines a nose angle in the range of 30-85°. The corner area includes a bevelled edge. A bisector of the nose angle intersects the bevelled edge at a centre thereof at a right angle.

These facts are disclosed in order to illustrate the technical problem addressed by the present disclosure.

General Description

The present disclosure relates to a cutting tool insert for turning, i.e. a turning insert, which is particularly useful for general turning of metallic work pieces, in particular of metallic pieces of high-performance alloys (namely heat resistant super alloys, HRSA).

The present disclosure is particularly useful for general turning of metallic work pieces of high-performance alloys (HRSA). Some of these alloys are developed specifically for applications demanding enhanced properties namely mechanical properties at high temperatures (close to their melting point). An exemplary use for these alloys is in the hot end of aircraft engines and land-based turbines. Almost every metallurgical change made to improve high temperature properties makes it more difficult to machine these alloys.

As high temperature strength is increased, these alloys become harder and stiffer at the cutting temperature. This results in increased cutting forces and increased wear on the cutting-edge during machining.

Because HRSA materials generate more heat during chip formation and the thermal heat conductivity of these alloys is relatively low, very high cutting temperatures are generated, which also contributes to an increased wear of the cutting edge.

To make matters even worse, as the alloys are heat treated to modify the as cast or solution treated properties, abrasive carbide precipitates or other secondary phase particles often form. These particles also cause rapid wear of the cutting edge.

The present invention aims at obviating the above-mentioned disadvantages of previously known turning inserts and at providing an improved turning insert.

Therefore, a primary aim of the invention in a first aspect is to improve the cutting geometry surface adjacent to the operatively active cutting edge of the insert, more precisely with the purpose of minimizing the risk of heat concentrations and crack formations in the material in the surface zone of the insert.

In an aspect of the disclosure, the cutting edge of the disclosed turning insert is operated at an angle to the metal work piece rotational axis, such that chip thickness is defined by the sine of the angle between the primary cutting edge and the metal work piece rotational axis, multiplied by the feed rate travel whereas in the prior art chip thickness is defined only by the feed rate travel.

By enabling the generation of a thinner and/or wider extracted chip, the disclosed turning insert can extract more heat from the turning operation, enabling lower turning temperatures and/or higher turning speeds and/or rates.

An aspect of the present disclosure relates to a nonsquare rhomboid-shaped double-sided turning insert (1) having a convex cutting corner (3, 4, 8) flanked by two flank faces (7), wherein the insert (1) comprises, on each side:

- a rhomboid-shaped rake face (2) opposite the face (2) of the opposite side,
- a lateral cutting corner surface (8) arranged adjoining and between the two flank faces (7),
- two flanking edges (5), each formed between a respective flank face (7) and a rhomboid side of the rake face (2),
- a cutting edge (3,4) formed by a straight primary cutting edge (4) and a straight secondary cutting edge (3), formed between the lateral cutting corner surface (8) and the rake face (2), arranged adjoining and between the two flanking edges (5), wherein the primary cutting edge (4) is longer than the secondary cutting edge (3), and a chip-deflecting surface (6) which is recessed and arranged inwardly of said cutting edge (3,4);
- wherein a lateral cutting corner surface of the insert, formed by the lateral cutting corner surfaces (8) of a first and a second side, extends between the first side and second side cutting edges (3,4),
- wherein the primary cutting edge (4) and secondary cutting edge (3) are in reversed positions between the first and second sides.

In an embodiment, a primary cutting edge flanking angle (A°) between a line extending from the primary cutting edge (4) and the respective adjoining flanking edge is larger than a secondary cutting edge flanking angle (B°) between a line extending from the secondary cutting edge (3) and the respective adjoining flanking edge.

In an embodiment, a primary-secondary angle (C°) between the primary cutting edge (4) and a line extending from the secondary cutting edge (3) is 30°-70°.

In an embodiment, a flanking angle (X1) between the two flanking edges (5) is 40°-70°.

In an embodiment, each primary cutting edge is associated, by the lateral cutting corner surface, with an opposite secondary cutting edge; and each secondary cutting edge is associated, by the lateral cutting corner surface, with an opposite primary cutting edge.

An embodiment comprises a further convex cutting corner and the insert being 180° rotationally symmetrical around an axis perpendicular and central to said rake faces (2).

The disclosure comprises a cutting edge vertex where the primary cutting edge (4) and the secondary cutting edge (3) meet, in particular said vertex comprising a convex curved cutting edge.

In an embodiment, the lateral cutting corner surface of the insert, formed by the lateral cutting corner surfaces (8) of the first and second sides, is warped such that a line extending between the vertex of the first rake face and the vertex of the second rake face forms an angle relative to the rake faces (H°) which is not perpendicular.

In an embodiment, the turning insert (1) is 180° rotationally symmetrical around a longitudinal central axis of the turning insert (1).

In an embodiment, the lateral cutting corner surface of the insert, formed by the lateral cutting corner surfaces (8) of the first and second sides, has a concave cross-section (F-F).

In an embodiment, the lateral cutting corner surface of the insert, formed by the lateral cutting corner surfaces (8) of the first and second sides, has a concave cross-section (F-F) inflected at a middle line between the first and second sides.

An embodiment comprises a bevelled edge adjacent to said cutting edge (3,4).

An embodiment comprises a chip-deflecting surface (6) which comprises said bevelled edge and is arranged inwardly of the bevelled edge.

In an embodiment, the primary cutting edge (4) and a secondary cutting edge (3) are more outwardly protruding than the flanking edges (5) in respect of the centre of said rake faces (2).

In an embodiment, the angle (K1) relative to the work piece to be cut is substantially 45°.

BRIEF DESCRIPTION OF THE DRAWINGS

The following figures provide preferred embodiments for illustrating the disclosure and should not be seen as limiting the scope of invention.

FIG. 5: Schematic representation of a perspective view of two embodiments of the turning insert according to the disclosure, wherein a first embodiment (a) comprises a lateral cutting corner surface between a first rake face and a second rake face with a concave cross-section (F-F); and a wherein a second embodiment (b) comprises a lateral cutting corner surface between a first rake face and a second rake face with a concave cross-section (F-F) which is inflected at a middle line between the first rake face and the second rake face; both represented in a perspective view (5.1), in a cross-section (F-F) view (5.2) and in a front view (5.3).

FIG. 6: Schematic representation of a perspective view of an embodiment of the turning insert according to the disclosure, emphasising the cutting corner surface between a first rake face and a second rake face.

FIG. 7: Schematic representation of a front and cross-section view of an embodiment of the turning insert according to the disclosure.

DETAILED DESCRIPTION

The present disclosure relates to a turning insert, intended for chip removing machining, of the type that comprises opposite top and bottom surfaces, at least one flank surface extending between said top and bottom surfaces, and a cutting edge being formed between the complex flank surface and at least one of said top and bottom surfaces, a cutting geometry surface, which is generally parallel to an imaginary reference plane through the insert extending inwardly from the cutting edge as to define a nose angle with a main edge and secondary in the range of 30-50°, and including, counted from the edge, a primary chamfer which transforms into a chip removing surface, which is inclined in the direction inwards/downwards in order to permit sinking of a chip being under deformation, and which transforms into a deflection surface being located deepest in the cutting geometry surface, and which via a concavely curved first transition surface, serving as a chip breaker.

The disclosed insert is based on a material cutting direction for a given insert side and for each cutting corner of the insert because the cutting corner is asymmetrical. An inverted cutting insert can be provided for cutting in the opposite direction.

In an embodiment, the define configuration of the edges and multiples flank faces can define a controlled edge angle able to reduce temperature concentration directly affecting the performance of the turning cutting insert, at the same time a double side rake face is made able.

A top view is a view in which the top, i.e. a first rake surface, is facing the viewer and the bottom surface, i.e. a second rake surface, is facing away from the viewer. The primary and secondary cutting edges are straight in a top view.

In an aspect of the disclosure, the cutting edge of the disclosed turning insert is operated at an angle to the metal work piece rotational axis, such that chip thickness C1 is defined by the sine of angle K1, i.e. the angle between the primary cutting edge and the metal work piece rotational axis, multiplied by the feed rate travel whereas in the prior art chip thickness is defined only by the feed rate travel.

The figures provide preferred embodiments for illustrating the disclosure and should not be seen as limiting the scope of invention.

Figure 1:
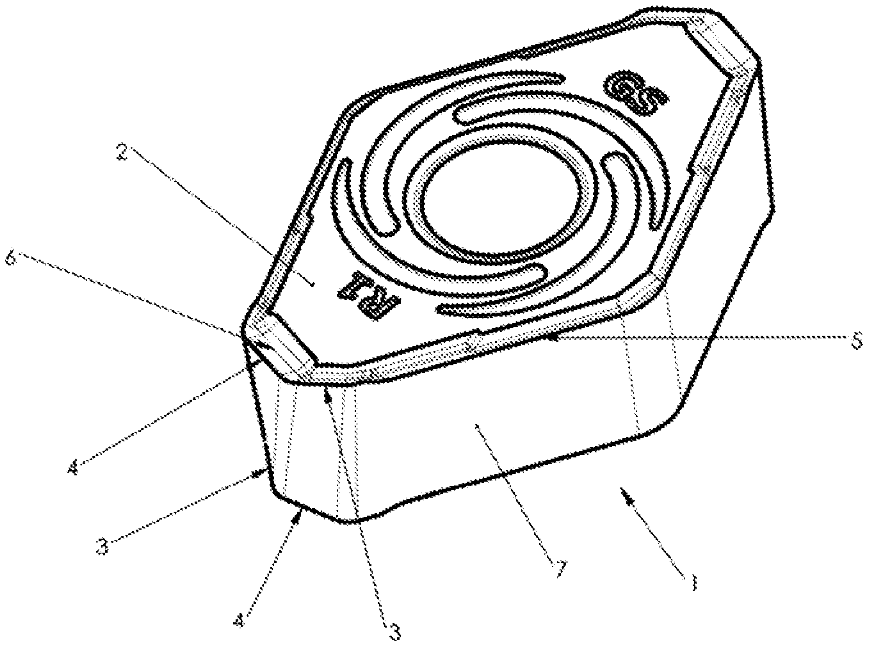
FIG. 1: Schematic representation of a perspective view of an embodiment of the turning insert according to the disclosure.

FIG. 1 shows a perspective view of an embodiment of the turning insert according to the disclosure, representing: rhomboid-shaped turning insert 1, rhomboid-shaped rake face 2, secondary cutting edge 3, primary cutting edge 4, flanking edge 5, chip-deflecting surface 6, and flank face 7.

Figure 2:
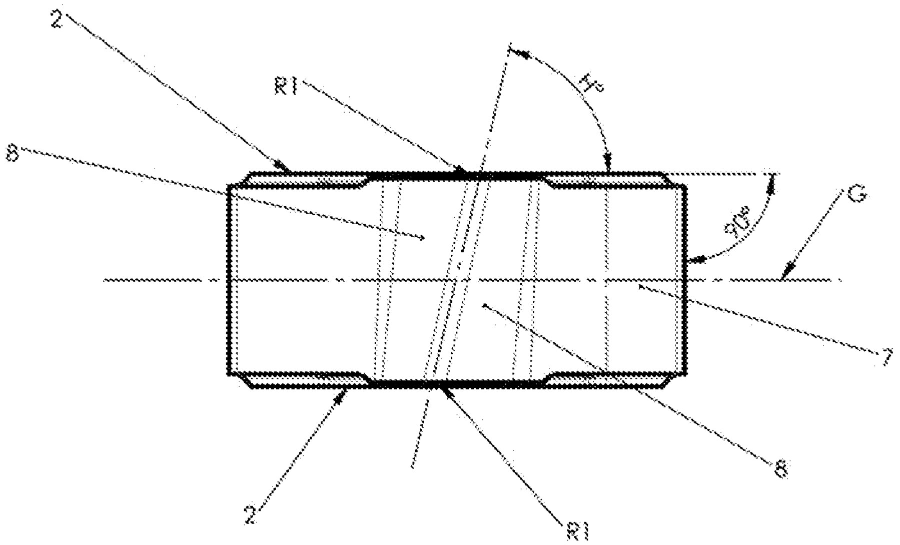
FIG. 2: Schematic representation of a front view of an embodiment of the turning insert according to the disclosure.

FIG. 2 shows a front view of an embodiment of the turning insert according to the disclosure, representing: lateral cutting corner surface 8.

Figure 3:
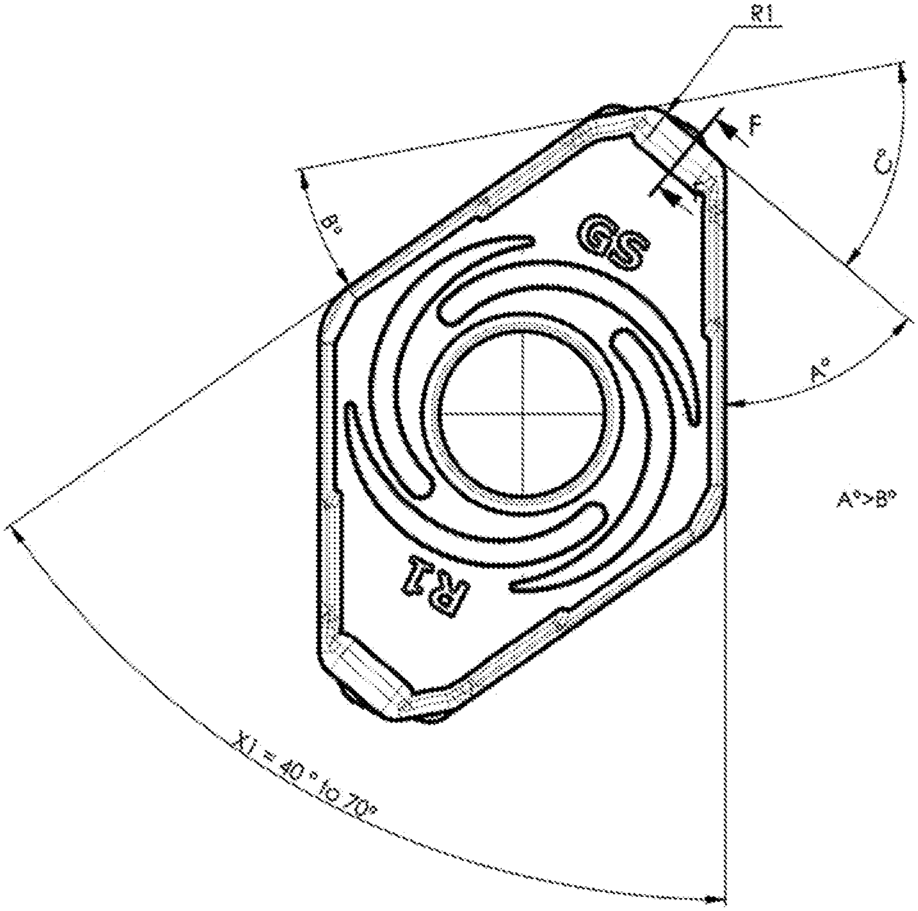
FIG. 3: Schematic representation of a top view of an embodiment of the turning insert according to the disclosure.

FIG. 3 shows a top view of an embodiment of the turning insert according to the disclosure.

Figure 4:
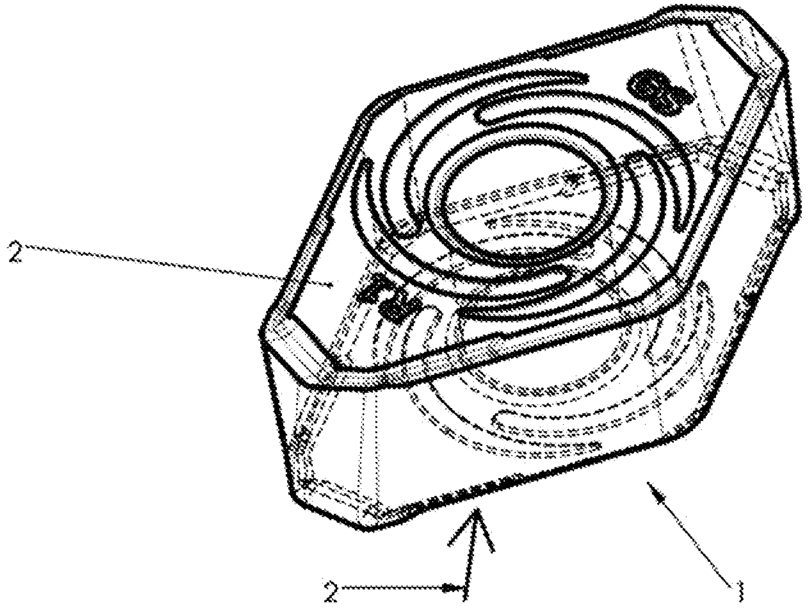
FIG. 4: Schematic representation of a perspective view of an embodiment of the turning insert according to the disclosure shown in transparent surface.

FIG. 4 shows a perspective view of an embodiment of the turning insert according to the disclosure shown in transparent surface.

FIG. 5 shows a perspective view of two embodiments of the turning insert according to the disclosure, wherein a first embodiment a comprises a lateral cutting corner surface between a first rake face and a second rake face with a concave cross-section F-F; and a wherein a second embodiment b comprises a lateral cutting corner surface between a first rake face and a second rake face with a concave cross-section F-F which is inflected at a middle line between the first rake face and the second rake face; both represented in a perspective view 5.1, in a cross-section F-F view 5.2 and in a front view 5.3.

FIG. 6 shows a perspective view of an embodiment of the turning insert according to the disclosure, emphasising the cutting corner surface between a first rake face and a second rake face.

FIG. 7 shows a front and cross-section view of an embodiment of the turning insert according to the disclosure.

Figure 8:
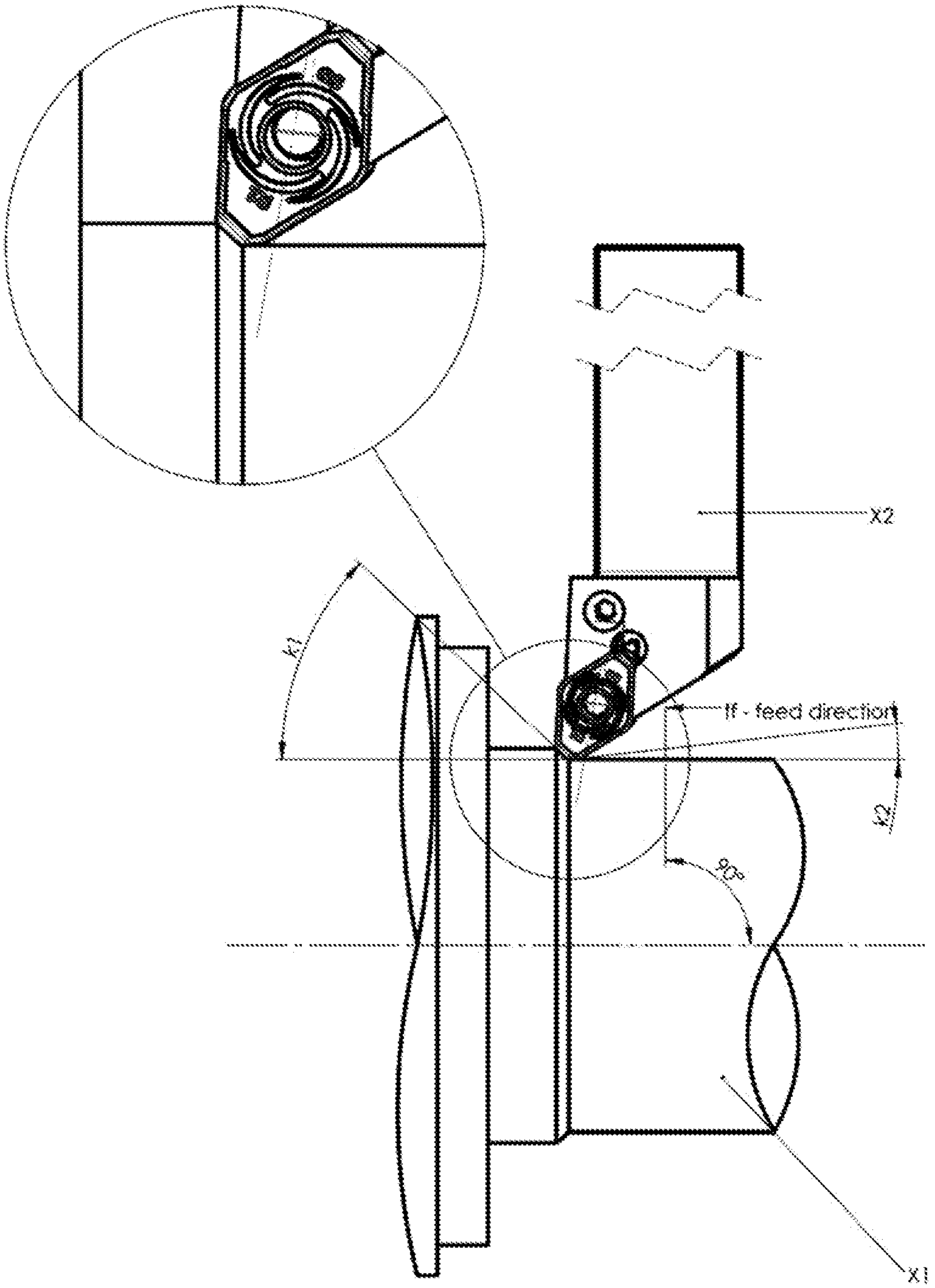
FIG. 8: Schematic representation of an embodiment of the turning insert according to the disclosure, in turning operation.

FIG. 8 shows an embodiment of the turning insert according to the disclosure, in turning operation.

Figure 9:
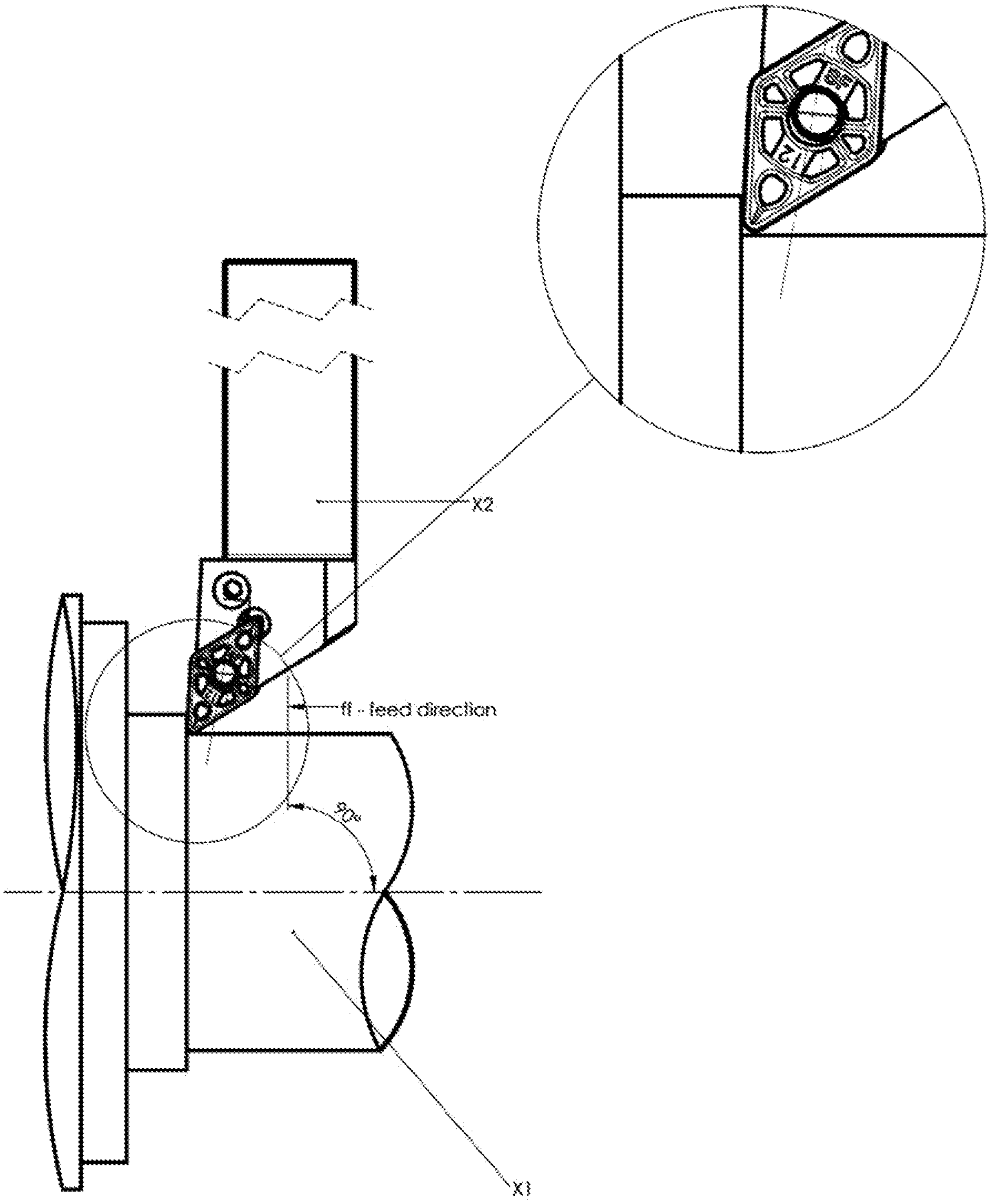
Fig. 9 (PRIOR ART)
FIG. 9: Schematic representation of an embodiment of the turning insert according to the prior art, in turning operation.

FIG. 9 shows an embodiment of the turning insert according to the prior art, in turning operation.

Figure 10:
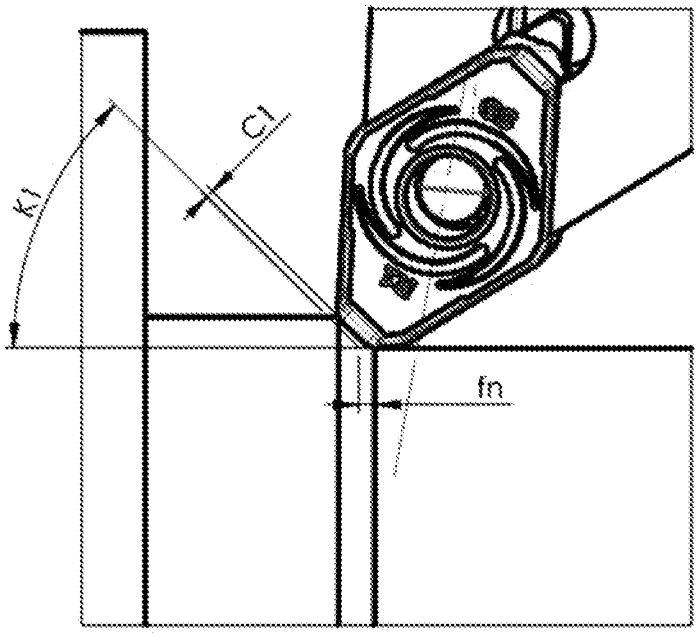
FIG. 10: Schematic detail representation of an embodiment of the turning insert according to the disclosure, in turning operation.

FIG. 10 shows an embodiment of the turning insert according to the disclosure, in turning operation.

Figure 11:
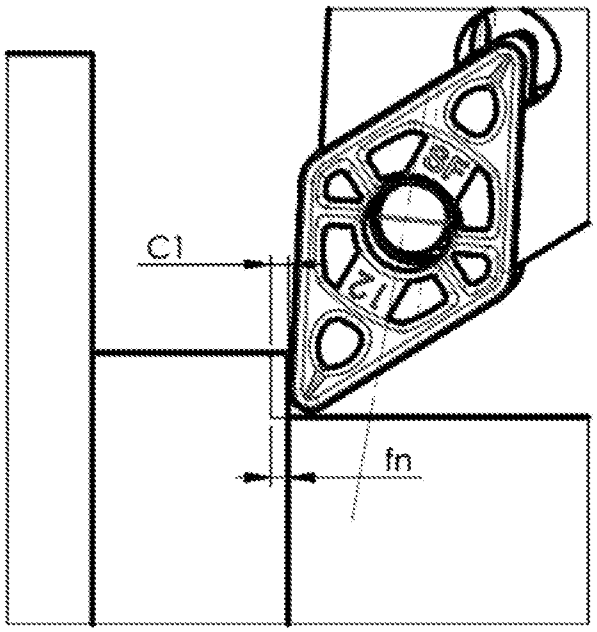
Fig. 11 (PRIOR ART)
FIG. 11: Schematic detail representation of an embodiment of the turning insert according to the prior art, in turning operation.

FIG. 11 shows an embodiment of the turning insert according to the prior art, in turning operation.

Figure 12:
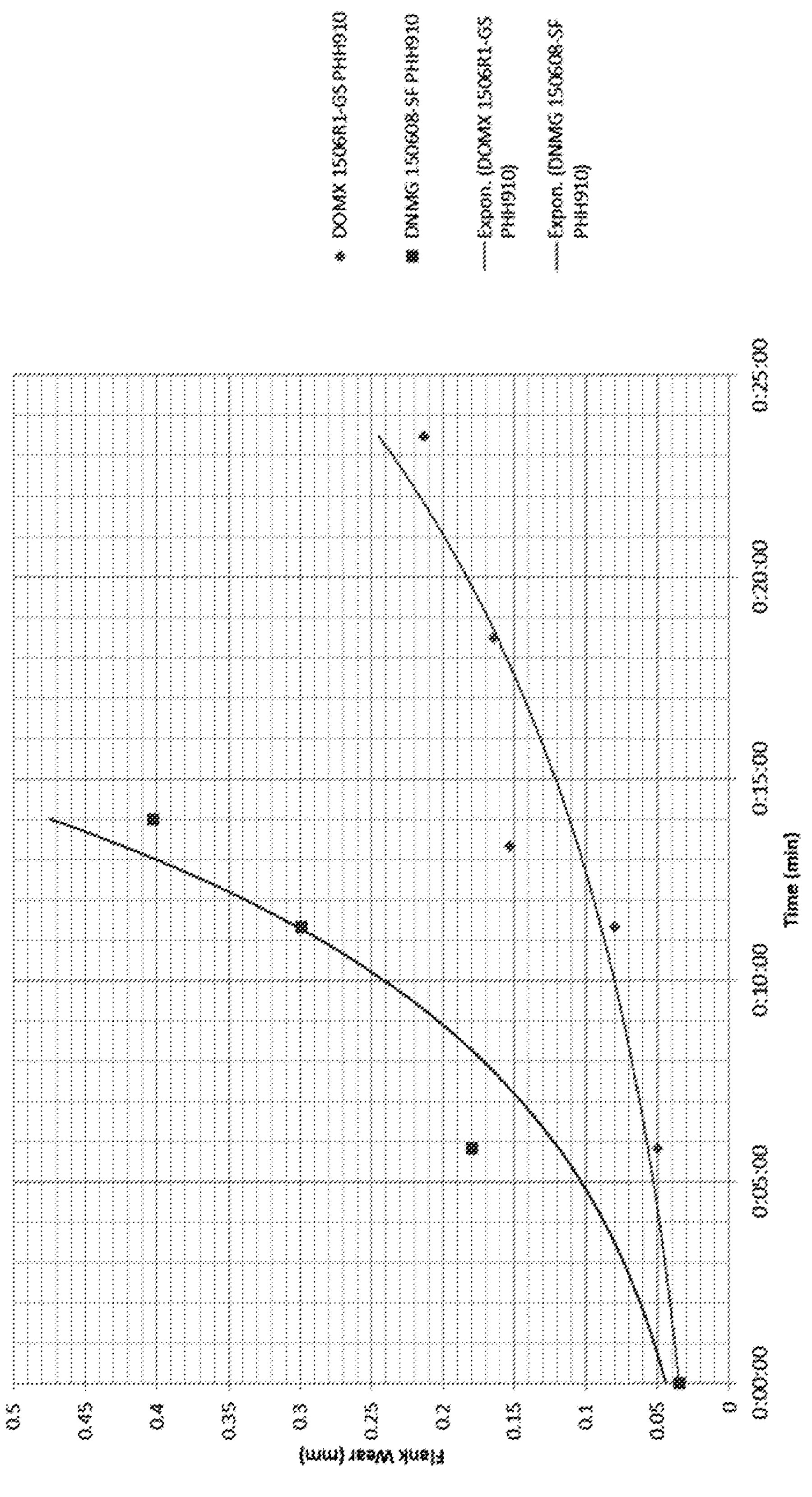
FIG. 12: Graphical representation comparing performance of an embodiment of the turning insert according to the disclosure relative to an embodiment of the turning insert according to the prior art in turning operation.

FIG. 12: Graphical representation comparing performance of an embodiment of the turning insert according to the disclosure relative to an embodiment of the turning insert according to the prior art in turning operation.

In order to evaluate the performance improvement, internal, longitudinal external turning cutting tests were performed and flank wear and failure modes were controlled. During cutting tests, a digital microscope was used at magnifications between x70 to x250 and standard recommendation of ISO 3685-1993 were followed.

The turning operation was made in a length of 80 mm, with starting diameter of 150 mm and ending diameter of 35 mm. The operation has been performed on stable conditions, removing the first outside material before starting the cutting test.

The tests were conducted on Inconel 625 Alloy. All material was from the same production batch (Produced by die casting). In order to have valid results the tests were performed on the same cylinder (only one was used during these tests).

The test included the CNMG 120408-GS PHH910 according to the disclosure against a publicly available insert having a prior art geometry CNMG 120408-GS 1105, as an exemplary comparison, and the results can be observed in FIG. 12. With a cutting speed of 75 m/min, Ap=0.5 mm and fn=0.12 mm/rev both inserts lasted 15 min approximately. GS PHH910 showed a slightly better wear flank evolution, but it is not clear a better performance by the disclosure under these cutting conditions. The type of Wear flank is built up material adhesion that lead to temperature increase and consequently insert failure (observed on FIG. 12—disclosed GS PHH910 vs SM 1105 with the following conditions: Vc=75 m/min|Ap=0.5 mm|fn=0.12 mm/rev.)

Figure 13A:
FIG. 13: Graphical representation comparing the linearity of the cutting edge, where curvature is such that (a) the cutting edge hinders the other side cutting edge, (b) the cutting edge performs as described but not with full performance, (c) the cutting edge is sufficiently straight that constant thickness chip is attained as defined in the disclosure.
Figure 13B:
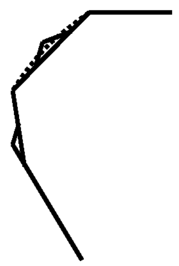
Figure 13C:
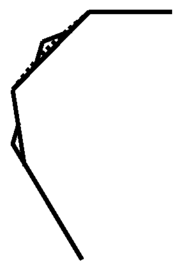

With an increase of the cutting speed to 85 m/min the chips started breaking and the inserts lasted longer as observed in FIG. 13 (disclosed GS PHH910 vs SM 1105 with the following conditions: Vc=85 m/min|Ap=0.5 mm|fn=0.12 mm/rev.).

The results show a 66% increase of machining time. CNMG 120408-GS PHH910 lasted 20 min against 12 min of CNMG 120408-GS 1105. Despite on the first 4 min both inserts have similar flank wear, the disclosed insert continues with a stable flank wear evolution and the comparison example increases drastically until it breaks at 12 min. The disclosed GS geometry outperforms 1105 in application.

FIG. 13 shows a graphical representation comparing the linearity of the cutting edge, where curvature is such that (a) the cutting edge hinders the other side cutting edge, (b) the cutting edge performs as described but not with full performance, (c) the cutting edge is sufficiently straight that constant thickness chip is attained as defined in the disclosure. The cutting edge of the other side has the same curvature (not represented in the figure). The straight cutting edge of the disclosed turning insert is thus operated at an angle to the metal work piece rotational axis, such that chip thickness is defined by the sine of the angle between the primary cutting edge and the metal work piece rotational axis, multiplied by the feed rate travel. By enabling the generation of a thinner and/or wider extracted chip, the disclosed turning insert can extract more heat from the turning operation, enabling lower turning temperatures and/or higher turning speeds and/or rates. This attains one of the main aims of the disclosure, minimizing the risk of heat concentrations and crack formations in the material in the surface zone of the insert.

The term "comprising" whenever used in this document is intended to indicate the presence of stated features, integers, steps, components, but not to preclude the presence or addition of one or more other features, integers, steps, components or groups thereof.

Furthermore, it is to be understood that the invention encompasses all variations, combinations, and permutations in which one or more limitations, elements, clauses, descriptive terms, etc., from one or more of the claims or from relevant portions of the description is introduced into another claim. For example, any claim that is dependent on another claim can be modified to include one or more limitations found in any other claim that is dependent on the same base claim.

The disclosure should not be seen in any way restricted to the embodiments described and a person with ordinary skill in the art will foresee many possibilities to modifications thereof.

The embodiments described above are combinable. The following claims further set out particular embodiments of the disclosure.

The invention claimed is:

1. A nonsquare rhomboid-shaped double-sided turning insert (1) having a convex cutting corner (3, 4, 8) flanked by two flank faces (7), wherein the insert (1) comprises, on each side:

a rhomboid-shaped rake face (2) opposite the face (2) of the opposite side, a lateral cutting corner surface (8) arranged adjoining and between the two flank faces (7), two flanking edges (5), each formed between a respective flank face (7) and a rhomboid side of the rake face (2), a cutting edge (3,4) formed by a straight primary cutting edge (4) and a straight secondary cutting edge (3), formed between the lateral cutting corner surface (8) and the rake face (2), arranged adjoining and between the two flanking edges (5), wherein the primary cutting edge (4) is longer than the secondary cutting edge (3), and a chip-deflecting surface (6) which is recessed and arranged inwardly of said cutting edge (3,4);

wherein a lateral cutting corner surface of the insert, formed by the lateral cutting corner surfaces (8) of a first and a second side, extends between the first side and second side cutting edges (3,4);

wherein the primary cutting edge (4) and secondary cutting edge (3) are in reversed positions between the first and second sides;

wherein the turning insert comprises a cutting edge vertex, where the primary cutting edge (4) and the secondary cutting edge (3) meet, said vertex having a convex curved cutting edge; and wherein a flanking angle (X1) between the two flanking edges (5) is 40°-70°;

wherein the lateral cutting corner surface (8) has a concave cross-section in a thickness-wise direction between the first and second rake faces; and wherein the insert is configured for turning such that the primary cutting edge is advanceable at an oblique angle (K1) relative to a workpiece rotational axis so that chip thickness is defined as a function of the sine of said oblique angle multiplied by feed rate.

2. The turning insert (1) according to claim 1 wherein a primary cutting edge flanking angle (A°) between a line extending from the primary cutting edge (4) and the respective adjoining flanking edge is larger than a secondary cutting edge flanking angle (B°) between a line extending from the secondary cutting edge (3) and the respective adjoining flanking edge.

3. The turning insert (1) according to claim 1 wherein a primary-secondary angle (C°) between the primary cutting edge (4) and a line extending from the secondary cutting edge (3) is 30°-70°.

4. The turning insert (1) according to claim 1 wherein each primary cutting edge is associated, by the lateral cutting corner surface, with an opposite secondary cutting edge; and wherein each secondary cutting edge is associated, by the lateral cutting corner surface, with an opposite primary cutting edge.

5. The turning insert (1) according to claim 1 comprising a further convex cutting corner and the insert being 180° rotationally symmetrical around an axis perpendicular and central to said rake faces (2).

6. The turning insert (1) according to claim 5 wherein the lateral cutting corner surface of the insert, formed by the lateral cutting corner surfaces (8) of the first and second sides, is warped such that a line extending between the vertex of the first rake face and the vertex of the second rake face forms an angle relative to the rake faces (H°) which is not perpendicular.

7. The turning insert (1) according to claim 1 wherein the turning insert (1) is 180° rotationally symmetrical around a longitudinal central axis of the turning insert (1).

8. The turning insert (1) according to claim 1 wherein the lateral cutting corner surface of the insert, formed by the lateral cutting corner surfaces (8) of the first and second sides, has a concave cross-section (F-F).

9. The turning insert (1) according to claim 8 wherein the lateral cutting corner surface of the insert, formed by the lateral cutting corner surfaces (8) of the first and second sides, has a concave cross-section (F-F) inflected at a middle line between the first and second sides.

10. The turning insert (1) according to claim 1 comprising a bevelled edge adjacent to said cutting edge (3,4).

11. The turning insert (1) according to claim 10 comprising a chip-deflecting surface (6) which comprises said bevelled edge and is arranged inwardly of the bevelled edge.

12. The turning insert (1) according to claim 1 wherein the primary cutting edge (4) and the secondary cutting edge (3) are more outwardly protruding than the flanking edges (5) in respect of the centre of said rake faces (2).

13. Method of operating a turning insert (1) according to claim 1, by cutting a work piece by turning, which comprises the step advancing the straight primary cutting edge (4) at an oblique angle (K1) relative to the work piece to be cut.

14. Method of operating a turning insert (1), according to claim 13, wherein the angle (K1) relative to the work piece to be cut is substantially 45°.

* * * * *